Patented July 22, 1952

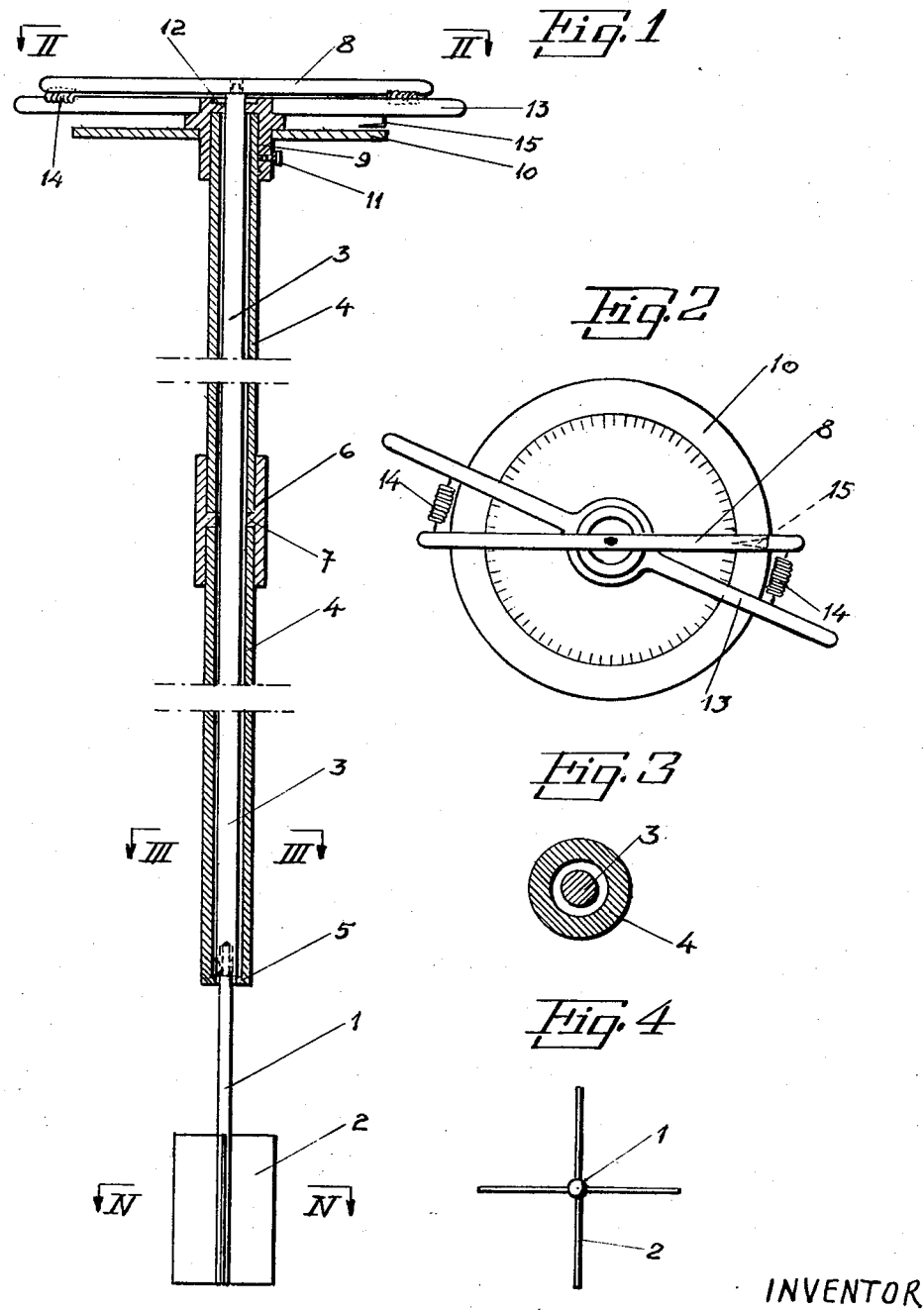

2,603,967

UNITED STATES PATENT OFFICE 2,603,967

APPARATUS FOR MEASURING THE TORSIONAL SHEAR STRENGTH OF SOIL

Lyman Otto Theodore Carlson,
Stockholm, Sweden

Application March 6, 1948, Serial No. 13,375
In Sweden September 5, 1947

5 Claims. (Cl. 73—101)

The present invention relates to improvements in performing investigations of ground by means of an auger which is driven into the ground and thereupon rotated, whereafter the obtained torsional moment is measured. In the first instance the invention has for its object the performance of investigations of ground for foundation purposes and thereby especially investigations for determining the shear strength of the different earth layers.

Hitherto the investigation of the shear strength of the ground is generally performed by obtaining samples of the ground and by examining the same in the laboratory. This manner of proceeding, however, is rather tedious and expensive and is impaired by the drawback that the samples often are damaged during the lifting from the ground and also may be during the transport to the laboratory, all of which of course may cause that the results of the examination point in a wrong direction.

There are, however, other methods for determining the shear strength of the ground directly on the field, that is to say, the so called probing methods. When performing these latter methods, a body of any shape is driven down into the ground and pulled out of it, and the necessary force is measured. Yet, these methods are impaired by the drawback that the shear strength of the ground can not be determined directly from the measured force, and on this account it is necessary, in order to obtain the correct value of the shear strength, to gauge the employed means by another reliable method. As at present such a method seems not to be available—laboratory tests, which in and per se may be rather exact, are performed on samples which may have been damaged during the extraction of the same or during the transport—consequently also the probing methods leave unreliable results.

The method according to the present invention is very easily performed and renders possible to make a direct calculation of the shear strength of the ground. No gauging is therefore necessary. The test is made directly in the ground so that no damages are caused in the ground due to taking samples. The improvements in performing investigations of ground as per the invention are substantially characterized by the feature, that an auger body is driven into the ground and then rotated, whereupon the required torsional moment is measured, the auger body being shaped thus that, when being driven into the ground, as little stirring of the earth as possible is caused, the auger body during the driving down movement being provided with a protecting device and before the rotating operation being removed from said protecting device so much that the auger body reaches a layer of earth which has not been stirred by the said protecting device. The shear strength of the ground is thereupon calculated on the basis of the torsional moment.

The improvements in the method as well as means for performing the same are hereinafter nearer described with reference to the accompanying drawing, wherein:

Fig. 1 shows schematically by way of example an embodiment of a device for the investigation of ground, in vertical section, Fig. 2 a top view of the device, Fig. 3 a transversal section along the line III—III in Fig. 1, and Fig. 4 a transversal section along the line IV—IV in Fig. 1.

According to the invention, the lowermost portion of the device, the auger body, consists of a rod 1 with circular cross section and provided with a number of wings 2, for instance, four wings of mainly rectangular shape. Both the rod 1 and the wings 2 have as little diameter and thickness respectively as possible in relation to the strength so as to avoid, as far as possible, any stirring of the earth when the auger is driven into the ground. The auger rod 1 has furthermore such a length that the protecting tube 4 surrounding the extension 3 of the auger rod 1 does not stir the earth to be tested, when the protecting tube is driven down into the ground. The extension 3 of the auger rod 1 consists of lengths of, for instance, one yard, and equally the protecting tube is composed of lengths of one yard. On the lowermost end of the protecting tube there is provided a guiding device 5, through which the auger rod 1 passes with good fitting. The different lengths of the protecting tube are assembled by means of bushings 6. Certain of those are provided with guiding devices 7 for the extension rods 3. On the uppermost end of the rod 3 there is provided a swing-bar 8, and the protecting rod 4 is on its upper end provided with a special fitting 9 on which is mounted a disk 10 with graduation. By means of a set screw 11 the fitting 9 may be firmly connected with the protecting tube 4. Internally the fitting 9 is provided with a guiding device 12 for the rod 3. Furthermore, the fitting 9 is provided with a swing-bar 13 which by means of spring-balances 14 is connected with the swing-bar 8. When swinging the bar 13, the torsional moment is thus by means of the spring-balances 14 imparted to the swing-bar 8. In order to check the angle of torsion, an indicator 15 is provided on the swing-bar 8 which indicator points to the graduation on the disk 10. The rod 3 may be lifted in the protecting tube 4 so that the upper ends of the wings 2 will contact the lowermost portion of the protecting tube, and in this position the device will be driven down into the ground, but during this operation the upper fitting 9 with the disk 10 and the swing-bars 13 and 8 are taken off. As soon as the desired depth is reached, the said fitting 9, the disk 10 and the swing-bars 13 and 8 are mounted, whereupon the rod together with the auger body is pressed down to a position shown in Fig. 1, in which the test is performed.

The torsional moment may also be measured by other means than the above described. For instance, the measuring may be performed by means of electrical elongation meters placed directly on the wings of the auger body. Obviously various changes might be made in the details of the arrangement herein shown without departing from the spirit or intent of the invention.

Having thus particularly described and ascertained my invention, what I claim as new and desire to secure by Letters Patent, is:

1. A tool for investigating ground comprising a shaft, an auger on the lower end of the shaft having a plurality of wings radially extending therefrom, a protective tube surrounding the major part of the shaft above said auger, said shaft being rotatable and axially slidable in said tube and having its upper end projecting from the tube, and operating means on said projecting upper end for rotating said shaft and said auger, said tube being provided at its lower end with guide means for said shaft, said lower tube end forming an abutment for said wings upon retraction of the shaft inside the tube.

2. A tool for investigating ground comprising a shaft, an auger on the lower end of the shaft having a plurality of wings radially extending therefrom, a protective tube surrounding the major part of the shaft above said auger, said shaft being rotatable and axially slidable in said tube and having its upper end projecting from the tube, and operating means on said projecting upper end for rotating said shaft and said auger, said operating means comprising a first handle fixedly secured to said shaft, a second handle rotatably mounted on the upper end of said tube, and spring means interconnecting said handles for entrainment of the first handle by the second handle.

3. A tool according to claim 2 comprising a scale member carried by the upper end of said tube and indicator means, cooperating with said scale member, carried by said first handle.

4. A tool for investigating ground comprising a shaft, an auger on the lower end of the shaft having a plurality of wings radially extending therefrom, a protective tube surrounding the major part of the shaft above said auger, said shaft being rotatable and axially slidable in said tube and having its upper end projecting from the tube, and operating means on said projecting upper end for rotating said shaft and said auger, said tube being provided at its lower end with guide means for said shaft, said lower tube end forming an abutment for said wings upon retraction of the shaft inside the tube, said operating means comprising a first handle fixedly secured to said shaft, a second handle rotatably mounted on the upper end of said tube, and spring means interconnecting said handles for entrainment of the first handle by the second handle.

5. A tool for investigating ground comprising a shaft, an auger on the lower end of the shaft having a plurality of wings radially extending therefrom, a protective tube surrounding the major part of the shaft above said auger, said shaft being rotatable and axially slidable in said tube and having its upper end projecting from the tube, operating means on said projecting upper end for rotating said shaft and said auger, said tube being provided at its lower end with guide means for said shaft, said lower tube end forming an abutment for said wings upon retraction of the shaft inside the tube, said operating means comprising a first handle fixedly secured to said shaft, a second handle rotatably mounted on the upper end of said tube, and spring means interconnecting said handles for entrainment of the first handle by the second handle; a scale member carried by the upper end of said tube and indicator means, cooperating with said scale member, carried by said first handle.

LYMAN OTTO THEODORE CARLSON.

REFERENCES CITED

The following references are of record in the file of this patent:

UNITED STATES PATENTS

| Number | Name | Date |
|---|---|---|
| 722,576 | Grand | Mar. 10, 1903 |
| 1,574,491 | Leake | Feb. 23, 1926 |
| 2,296,466 | Dames et al. | Sept. 22, 1942 |
| 2,382,979 | Demb | Aug. 21, 1945 |

FOREIGN PATENTS

| Number | Country | Date |
|---|---|---|
| 187,159 | Great Britain | Oct. 19, 1922 |